United States Patent
Zhou et al.

(10) Patent No.: US 9,723,190 B2
(45) Date of Patent: Aug. 1, 2017

(54) VIDEO SURVEILLANCE METHOD, DEVICE, AND SYSTEM

(71) Applicant: Huawei Technologies Co., Ltd., Shenzhen (CN)

(72) Inventors: Ming Zhou, Hangzhou (CN); Zhiquan Yang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 161 days.

(21) Appl. No.: 14/688,358

(22) Filed: Apr. 16, 2015

(65) Prior Publication Data

US 2015/0222797 A1 Aug. 6, 2015

Related U.S. Application Data

(63) Continuation of application No. PCT/CN2013/085196, filed on Oct. 14, 2013.

(30) Foreign Application Priority Data

Oct. 16, 2012 (CN) .......................... 2012 1 0392534

(51) Int. Cl.
*H04N 7/00* (2011.01)
*H04N 5/225* (2006.01)
(Continued)

(52) U.S. Cl.
CPC ....... *H04N 5/2259* (2013.01); *H04N 5/23238* (2013.01); *H04N 7/18* (2013.01); *H04N 5/23203* (2013.01)

(58) Field of Classification Search
CPC .... H04N 5/23238; H04N 5/2259; H04N 7/18; H04N 5/23203
See application file for complete search history.

(56) References Cited

U.S. PATENT DOCUMENTS

| 2012/0062695 | A1 | 3/2012 | Sakaki |
| 2014/0049640 | A1* | 2/2014 | Shishalov ................ H04N 7/18 348/143 |

FOREIGN PATENT DOCUMENTS

| CN | 101146216 A | 3/2008 |
| CN | 101291428 A | 10/2008 |

(Continued)

OTHER PUBLICATIONS

Partial English Translation and Abstract of Japanese Patent Application No. JP2005150902, Nov. 9, 2016, 45 pages.

(Continued)

*Primary Examiner* — Sath V Perungavoor
*Assistant Examiner* — Peet Dhillon
(74) *Attorney, Agent, or Firm* — Quarles & Brady LLP (57) ABSTRACT

A video surveillance method, device, and system, which relate to the field of video surveillance and can reduce complexity of a locating operation and improve locating efficiency. The video surveillance method includes receiving, by a user equipment, a panorama sent by a camera; obtaining, by the user equipment, a view that is specified by a user and in the panorama; obtaining, by the user equipment according to a preset correspondence between a view and an angle, a surveillance angle corresponding to the view specified by the user; and sending, by the user equipment, the surveillance angle to the camera, so that the camera adjusts an angle of the camera to the surveillance angle. The present invention is applicable to viewing video surveillance view information.

15 Claims, 7 Drawing Sheets

(51) Int. Cl.
*H04N 7/18* (2006.01)
*H04N 5/232* (2006.01)

(56) References Cited

FOREIGN PATENT DOCUMENTS

| | | | |
|---|---|---|---|
| CN | 101487894 A | 7/2009 | |
| CN | 101917598 B | 6/2011 | |
| CN | 102461153 A | 5/2012 | |
| EP | 2509303 A2 | 10/2012 | |
| JP | 08088787 H | 4/1996 | |
| JP | 2004186907 A | 7/2004 | |
| JP | 2004214830 A | 7/2004 | |
| JP | 2005150902 A | 6/2005 | |
| JP | 2007142896 A | 6/2007 | |
| JP | 2008236785 A | 10/2008 | |
| RU | WO 2012118403 A1 * | 9/2012 | ........... G08B 17/005 |

OTHER PUBLICATIONS

Partial English Translation and Abstract of Japanese Patent Application No. JP2007142896, Nov. 9, 2016, 64 pages.
Foreign Communication From a Counterpart Application, Japanese Application No. 2015-537130, Japanese Notice of Rejection dated Sep. 20, 2016, 4 pages.
Foreign Communication From a Counterpart Application, Japanese Application No. 2015-537130, English Translation of Japanese Notice of Rejection dated Sep. 20, 2016, 3 pages.
Foreign Communication From a Counterpart Application, European Application No. 13846452.4, Extended European Search Report dated Aug. 13, 2015, 5 pages.
Partial English Translation and Abstract of Chinese Patent Application No. CN101291428A, Apr. 27, 2015, 5 pages.
Partial English Translation and Abstract of Chinese Patent Application No. CN101917598A, Apr. 27, 2015, 22 pages.
Foreign Communication From a Counterpart Application, PCT Application No. PCT/CN2013/085196, English Translation of International Search Report dated Jan. 16, 2014, 2 pages.
Foreign Communication From a Counterpart Application, PCT Application No. PCT/CN2013/085196, English Translation of Written Opinion dated Jan. 16, 2014, 10 pages.
Foreign Communication From a Counterpart Application, Chinese Application No. 201210392534.4, Chinese Office Action dated Jun. 2, 2016, 7 pages.
Partial English Translation and Abstract of Japanese Patent Application No. JPA2004-186907, May 25, 2016, 51 pages.
Partial English Translation and Abstract of Japanese Patent Application No. JPA2004-214830, May 25, 61 pages.
Partial English Translation and Abstract of Japanese Patent Application No. JPA2008236785, May 25, 2016, 59 pages.
Partial English Translation and Abstract of Japanese Patent Application No. JPH8-088787, May 25, 2016, 19 pages.
Foreign Communication From a Counterpart Application, Japanese Application No. 2015-537130, Japanese Office Action dated Mar. 28, 2016, 3 pages.
Foreign Communication From a Counterpart Application, Japanese Application No. 2015-537130, English Translation of Japanese Office Action dated Apr. 5, 2016, 3 pages.
Office Action (including English translation) issued in corresponding Chinese Patent Application No. 201210392534.4 dated May 27, 2017, 19 pages.

* cited by examiner

VIDEO SURVEILLANCE METHOD, DEVICE, AND SYSTEM

CROSS-REFERENCE TO RELATED APPLICATION

This application is a continuation of International Application No. PCT/CN2013/085196, filed on Oct. 14, 2013, which claims priority to Chinese Patent Application No. 201210392534.4, filed on Oct. 16, 2012, both of which are hereby incorporated by reference in their entireties.

TECHNICAL FIELD

The present invention relates to the field of video surveillance, and in particular, to a video surveillance method, device, and system.

BACKGROUND

In the field of video surveillance, increasingly high requirements are imposed on panoramic control of a surveillance scene, and quickly adjusting a camera to a surveillance location specified by a user arouses increasing concern. An existing video surveillance system includes a camera, a server, and a user equipment, where the camera is generally a camera with pan-tilt-zoom (PTZ) control, for example, a PTZ camera.

In an existing video surveillance scene, there are mainly two methods for navigating a camera to a surveillance location specified by a user: One method is that the user adjusts a PTZ control button for multiple times so that the camera is gradually adjusted to the location desired by the user and then surveillance information of the location is viewable; the other method is that the user sets a preset location, and, when needing to view a location, the user directly invokes a corresponding preset location to obtain the location that the user needs to view. However, regardless of whether the surveillance information of the desired location is viewed by means of manual adjustment or by setting a preset location, complexity of a locating operation is relatively high, and locating efficiency is relatively low.

SUMMARY

Embodiments of the present invention provide a video surveillance method, device, and system, which can reduce complexity of a locating operation and improve locating efficiency.

To achieve the foregoing objectives, the following technical solutions are adopted in the embodiments of the present invention:

According to one aspect, a video surveillance method is provided and includes receiving, by a user equipment, a panorama sent by a camera; obtaining, by the user equipment, a view that is specified by a user and in the panorama; obtaining, by the user equipment according to a preset correspondence between a view and an angle, a surveillance angle corresponding to the view specified by the user; and sending, by the user equipment, the surveillance angle to the camera, so that the camera adjusts an angle of the camera to the surveillance angle.

The obtaining, by the user equipment according to a preset correspondence between a view and an angle, a surveillance angle corresponding to the view specified by the user, includes obtaining, by the user equipment, a geometric center of the specified view; and obtaining, by the user equipment according to the correspondence between a view and an angle, the surveillance angle corresponding to the geometric center.

The receiving, by a user equipment, a panorama sent by a camera, includes receiving, by the user equipment, the panorama sent by a server, where the panorama is sent by the camera to the server.

The sending, by the user equipment, the surveillance angle to the camera, includes sending, by the user equipment, the surveillance angle to the server, so that the server sends the surveillance angle to the camera.

According to one aspect, a user equipment is provided and includes a first receiving unit configured to receive a panorama sent by a camera, and send the panorama to a first obtaining unit; the first obtaining unit configured to receive the panorama sent by the first receiving unit, obtain a view that is specified by a user and in the panorama, and send the view specified by the user to a second obtaining unit; the second obtaining unit configured to receive the view that is specified by the user and sent by the first obtaining unit, and obtain, according to a preset correspondence between a view and an angle, a surveillance angle corresponding to the view specified by the user, and send the surveillance angle to a first sending unit; and the first sending unit configured to receive the surveillance angle sent by the second obtaining unit, and send the surveillance angle to the camera, so that the camera adjusts an angle of the camera to the surveillance angle.

The second obtaining unit is configured to obtain a geometric center of the specified view; and obtain, according to the correspondence between a view and an angle, the surveillance angle corresponding to the geometric center.

The first receiving unit is configured to receive the panorama sent by a server, where the panorama is sent by the camera to the server.

The first sending unit is configured to send the surveillance angle to the server, so that the server sends the surveillance angle to the camera.

According to one aspect, a video surveillance system is provided and includes a user equipment, where the user equipment is configured to receive a panorama sent by a camera; obtain a view that is specified by a user and in the panorama; obtain, according to a preset correspondence between a view and an angle, a surveillance angle corresponding to the view specified by the user; and send the surveillance angle to the camera, so that the camera adjusts an angle of the camera to the surveillance angle.

The video surveillance system further includes a camera, where the camera is configured to obtain, according to the preset correspondence between a view and an angle, a panorama, where the panorama is formed by surveillance views in a surveillance scope of the camera; send the panorama to the user equipment, so that the user equipment obtains the surveillance angle corresponding to the view that is specified by the user and in the panorama; receive the surveillance angle sent by the user equipment; and adjust the angle of the camera to the surveillance angle; and a server configured to receive the panorama sent by the camera, and send the panorama to the user equipment, where the server is further configured to receive the surveillance angle sent by the user equipment, and send the surveillance angle to the camera.

In the video surveillance method, device, and system provided in the embodiments of the present invention, a user equipment receives a panorama sent by a camera; the user equipment obtains a view that is specified by a user and in the panorama; the user equipment obtains, according to a preset correspondence between a view and an angle, a surveillance angle corresponding to the view specified by the user; and the user equipment sends the surveillance angle to the camera, so that the camera adjusts an angle of the camera to the surveillance angle. In this way, the user directly obtains the specified view in the panorama without a need of searching for the specified view by setting a preset location or by manually adjusting a PTZ control button, which reduces complexity of a locating operation. In addition, the specified view is obtained from the panorama and the camera is adjusted to the corresponding surveillance angle, which saves time and improves locating efficiency compared with search in a preset location or manual adjustment.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
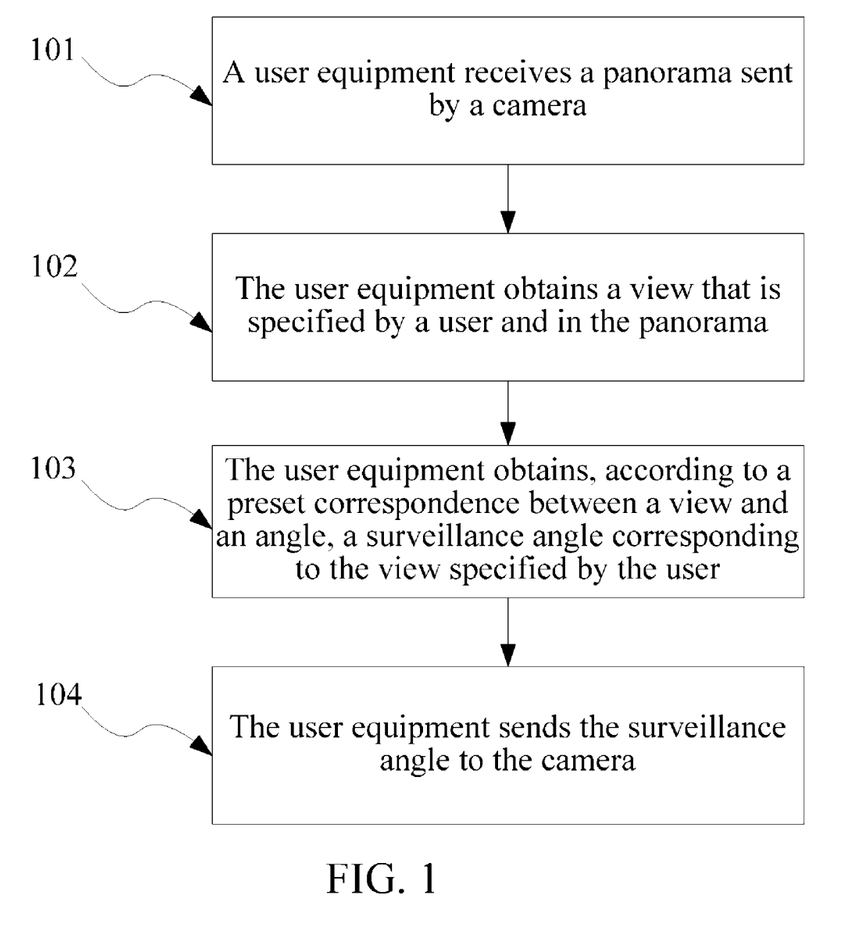
FIG. 1 is a flowchart of a video surveillance method according to Embodiment 1 of the present invention.

This embodiment of the present invention provides a video surveillance method, and relates to a user equipment side. As shown in FIG. 1, the method includes the following steps:

101. A user equipment receives a panorama sent by a camera.

The user equipment may directly receive the panorama from the camera or receive the panorama forwarded by a server. After generating the panorama, the camera sends the panorama to the server, and the server forwards the panorama to the user equipment. The panorama received by the user equipment may be any one of a planar view, a cylindrical view, a three-dimensional view, and a fish-eye view.

102. The user equipment obtains a view that is specified by a user and in the panorama.

103. The user equipment obtains, according to a preset correspondence between a view and an angle, a surveillance angle corresponding to the view specified by the user.

The correspondence between a view and an angle, on the one hand, may be a calculated surveillance angle corresponding to the view specified by the user, or, on the other hand, when a surveillance view is scanned on a camera side, an angle corresponding to the surveillance view may be directly recorded to generate the correspondence between a view and an angle. In the correspondence between a view and an angle, each surveillance angle corresponds to one surveillance view of the panorama. Therefore, the user equipment may obtain, according to the correspondence between a view and an angle, the surveillance angle corresponding to the view that is specified by the user and in the panorama.

104. The user equipment sends the surveillance angle to the camera.

When video surveillance is implemented using the foregoing method, a user directly obtains a specified view in a panorama without a need of searching for the specified view by setting a preset location or by manually adjusting a PTZ control button, which reduces complexity of a locating operation. In addition, the specified view is obtained from the panorama and a camera is adjusted to a corresponding surveillance angle, which saves time and improves locating efficiency compared with search in a preset location or manual adjustment.

Figure 2:
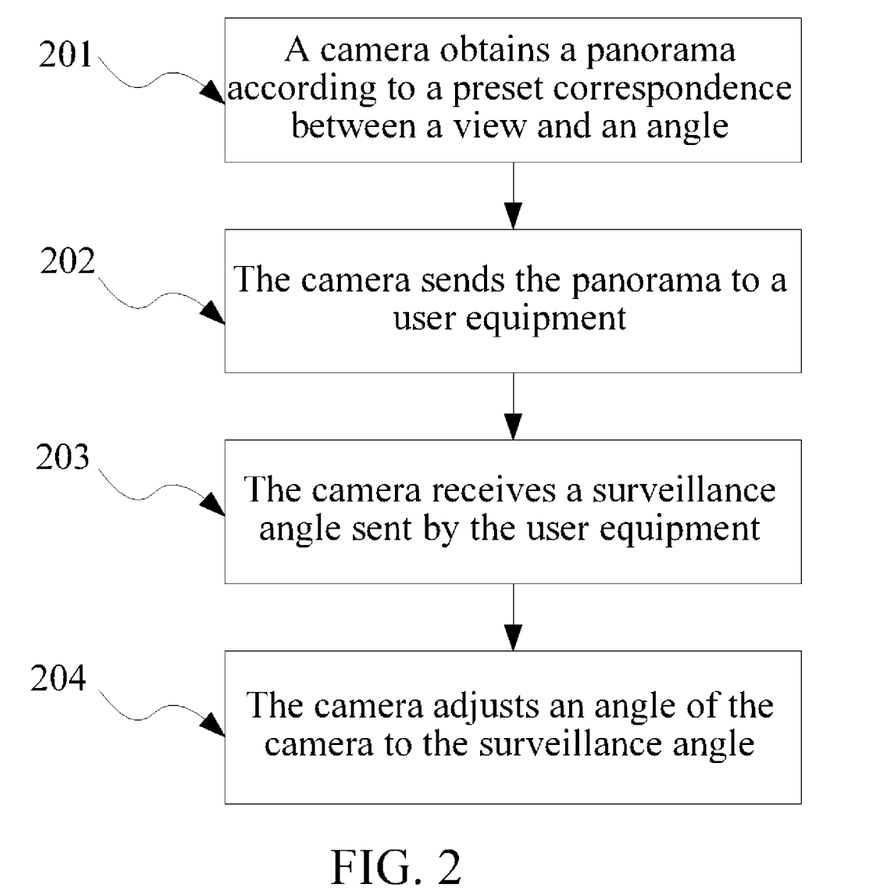
FIG. 2 is a flowchart of another video surveillance method according to Embodiment 1 of the present invention.

This embodiment of the present invention further provides a video surveillance method, and relates to a camera side. As shown in FIG. 2, the method includes the following steps:

201. A camera obtains a panorama according to a preset correspondence between a view and an angle.

The correspondence between a view and an angle may be a correspondence between a view and an angle, which is generated by directly recording an angle corresponding to a surveillance view when the surveillance view is scanned on the camera side.

The panorama is formed by surveillance views in a surveillance scope of the camera. The camera may scan a scene in the surveillance scope of the camera to obtain the surveillance views, and then combine the surveillance views into the panorama according to the correspondence between a view and an angle. The panorama may be any one of a planar view, a cylindrical view, a three-dimensional view, and a fish-eye view.

202. The camera sends the panorama to a user equipment.

The camera may directly send the panorama to the user equipment, or may send the panorama to a server and the server forwards the panorama to the user equipment.

203. The camera receives a surveillance angle sent by the user equipment.

The camera may directly receive the surveillance angle from the user equipment, or the user equipment sends the surveillance angle to the server and the server forwards the surveillance angle to the camera.

204. The camera adjusts an angle of the camera to the surveillance angle.

When video surveillance is implemented using the foregoing method, a user directly obtains a specified view in a panorama without a need of searching for the specified view by setting a preset location or by manually adjusting a PTZ control button, which reduces complexity of a locating operation. In addition, the specified view is obtained from the panorama and a camera is adjusted to a corresponding surveillance angle, which saves time and improves locating efficiency compared with search in a preset location or manual adjustment.

Figure 3:
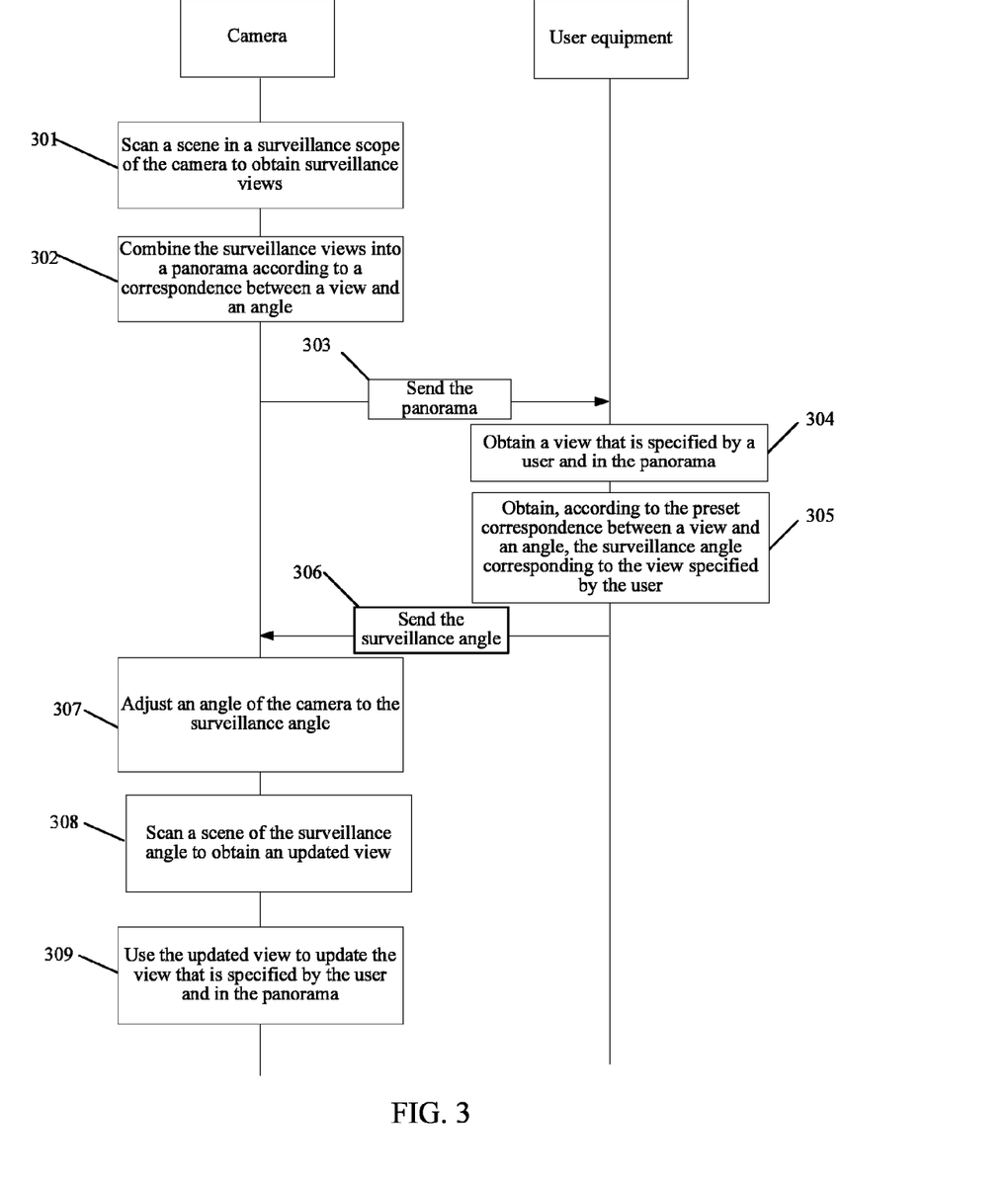
FIG. 3 is a flowchart of another video surveillance method according to Embodiment 1 of the present invention.

Exemplarily, this embodiment of the present invention further provides a video surveillance method. As shown in FIG. 3, the method includes the following steps:

301. A camera scans a scene in a surveillance scope of the camera to obtain surveillance views.

302. The camera combines the surveillance views into a panorama according to a correspondence between a view and an angle.

The correspondence between a view and an angle may be a correspondence between a view and an angle, which is generated by directly recording an angle corresponding to a surveillance view when the surveillance view is scanned on a camera side. That is, each time the camera adjusts a surveillance angle, the camera records a center point of a surveillance view corresponding to the surveillance angle accordingly, to form the correspondence between a view and an angle.

When the panorama is generated, the camera scans the scene in the surveillance scope of the camera, obtains a surveillance view in each direction in the surveillance scope of the camera by means of scanning, and records a corresponding surveillance angle, and then, according to formulas $$x = \frac{\alpha_h}{H} * \text{Width and } y = \frac{\beta_v}{V} * \text{Height,}$$

calculates a corresponding horizontal coordinate value x of a current surveillance angle in the surveillance view and a corresponding vertical coordinate value y of the current surveillance angle in the surveillance view, where H is a horizontal angle scope that can be monitored by the camera, V is a vertical angle scope that can be monitored by the camera, Width is a width of the surveillance view, Height is a height of the surveillance view, $\alpha_h$ is an angle formed against a horizontal direction when the camera scans the surveillance view, and $\beta_v$ is an angle formed against a vertical direction when the camera scans the surveillance view. Exemplarily, according to the corresponding horizontal coordinate value x of the current surveillance angle in the surveillance view and the corresponding vertical coordinate value y of the current surveillance angle in the surveillance view, the camera may synthesize surveillance views into a planar panorama. In this case, a horizontal scope of the panorama is Width, and a vertical scope of the panorama is Height. Alternatively, according to the corresponding horizontal coordinate value x of the current surveillance angle in the surveillance view and the corresponding vertical coordinate value y of the current surveillance angle in the surveillance view, the camera may synthesize into a spherical panorama the surveillance views, the angle $\alpha_h$ formed against the horizontal direction when the camera scans the surveillance view, and the angle $\beta_v$ formed against the vertical direction when the camera scans the surveillance view. If the spherical panorama is horizontally expanded, the horizontal scope of the panorama is Width, and the vertical scope of the panorama is Height. In this way, in the panorama, the correspondence between a view and an angle may also be expressed by $$x = \frac{\alpha_h}{H} * \text{Width and } y = \frac{\beta_v}{V} * \text{Height}$$

A center point of each angle is in a one-to-one mapping relationship with a center point of each view.

It should be noted that the panorama may also be a cylindrical view, a fish-eye view, or the like. Correspondingly, a formula for expressing the correspondence between a view and an angle may be adjusted according to specific conditions. For example, a panorama is obtained by means of mathematical linear transformation or nonlinear transformation. Any person skilled in the art may readily figure out variations or replacements without departing from the technical scope disclosed in the present invention, and therefore, details are not described again.

The panorama may also be synthesized by the user equipment. The camera scans a scene in the surveillance scope of the camera to obtain a surveillance view in each direction, and reports each surveillance view and a camera scanning angle value corresponding to each surveillance view to the user equipment; alternatively, when necessary, the user equipment triggers a reporting mechanism of the camera, and then the camera reports the surveillance view and the camera scanning angle value corresponding to each surveillance view to the user equipment, and the user equipment combines the surveillance views into a panorama according to the correspondence between a view and an angle.

The panorama may also be synthesized by the server. A specific synthesis process is the same as a synthesis process on the camera side. Any person skilled in the art may readily figure out variations or replacements without departing from the technical scope disclosed in the present invention, and therefore, details are not described again.

303. The camera sends the panorama to the user equipment.

The user equipment may, according to its own requirements, trigger the reporting mechanism of the camera when the panorama is required, and then the camera sends the panorama to the user equipment.

Specially, when sending the panorama, the camera may send the correspondence between a view and an angle to the user equipment at the same time, where the correspondence is generated by means of recording when the surveillance view is scanned.

304. The user equipment obtains a view that is specified by a user and in the panorama.

When the user obtains the view that is specified by the user and in the panorama, if the user selects the specified view by clicking, a clicking point is used as a center point of the view specified by the user; if the user selects the specified view by selecting a rectangle, a triangle, or a circle, a geometric center of a shape selected by the user is used as a center point of the view specified by the user. Specially, a selection criterion may be preset in the user equipment, and then, when the user specifies a view, the user equipment determines a corresponding center point according to the selection criterion. Exemplarily, if the preset selection criterion is: the center point of the view specified by the user is a point that is apart from a point specified by the user at a fixed angle or at a fixed distance, then, when the user specifies a point on the panorama, the center point of the view, which is specified by the user and determined by the user equipment, is a point that is apart from the point specified by the user at a fixed angle or at a fixed distance.

305. The user equipment obtains, according to the preset correspondence between a view and an angle, a surveillance angle corresponding to the view specified by the user.

On the one hand, if a panorama message sent by the camera carries the correspondence between a view and an angle, where the correspondence is generated by means of recording when the camera scans a surveillance view, the user equipment may directly search out, according to the correspondence between a view and an angle, a surveillance angle of the camera corresponding to the center point of the view specified by the user.

Figure 4:
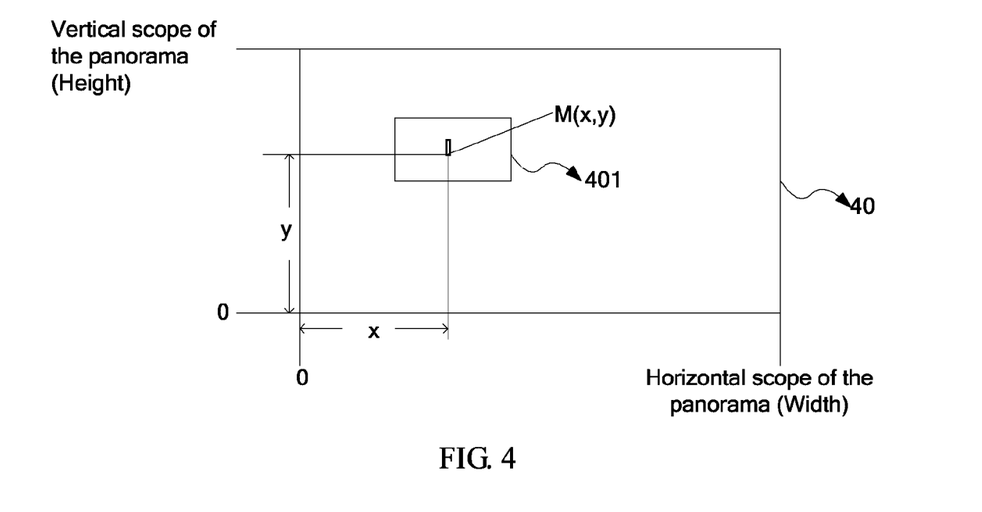
FIG. 4 is an exemplary diagram according to Embodiment 1 of the present invention.

On the other hand, if the panorama message sent by the camera does not carry the correspondence between a view and an angle, where the correspondence is generated by means of recording when the camera scans a surveillance view, the user equipment may obtain the correspondence between a view and an angle by means of calculation according to a preset formula. As shown in FIG. 4, in a panorama 40, Width is the width of the panorama, Height is the height of the panorama, M(x, y) is a center point of a view 401 specified by the user, where x is a horizontal coordinate of the center point of the view 401 specified by the user and y is a vertical coordinate of the center point, and, according to $$\alpha_h = \frac{x}{\text{Width}} * H \text{ and } \beta_V = \frac{y}{\text{Height}} * V,$$

the user equipment calculates camera surveillance angles $\alpha_h$ and $\beta_v$ corresponding to the center point.

It should be noted that the surveillance angle $\alpha_h$ is an angle formed against the horizontal direction when the camera scans the surveillance view, and $\beta_v$ is an angle formed against the vertical direction when the camera scans the surveillance view. Therefore, the surveillance angles $\alpha_h$ and $\beta_v$ are relative angles that are set in a frame of reference. In a practical application, the surveillance angles may also be expressed by actual angles of the camera, that is, $\alpha_h$ and $\beta_v$ may be converted into angles of actual rotation of the camera.

306. The user equipment sends the surveillance angle corresponding to the view specified by the user to the camera.

307. The camera adjusts an angle of the camera to the surveillance angle.

When the surveillance angle received by the camera is the relative angles $\alpha_h$ and $\beta_v$ that are set in the frame of reference, $\alpha_h$ and $\beta_v$ may be converted into the angles of actual rotation of the camera and then the surveillance angles are adjusted. When the surveillance angle received by the camera is an actual angle of the camera, it is appropriate for the camera to rotate by the surveillance angle directly.

308. The camera scans a scene of the surveillance angle to obtain an updated view.

The camera adjusts the angle of the camera to the surveillance angle. After the user views surveillance view information corresponding to the angle, the camera scans the scene of the surveillance angle to obtain the updated view.

309. The camera uses the updated view to update the view that is specified by the user and in the panorama.

The camera uses the updated view to replace the view that is specified by the user and in the original panorama, so that the panorama is partly updated and view information in the panorama has timeliness to some extent.

The camera may also send the updated view to the server or the user equipment, and the server or the user equipment updates the view that is specified by the user and in the original panorama.

It should be noted that a sequence of steps of a video surveillance method provided in this embodiment of the present invention may be adjusted properly, and some steps may also be added or removed according to conditions. Any person skilled in the art may readily figure out modified methods without departing from the technical scope disclosed in the present invention, and therefore, details are not described again.

Figure 5:
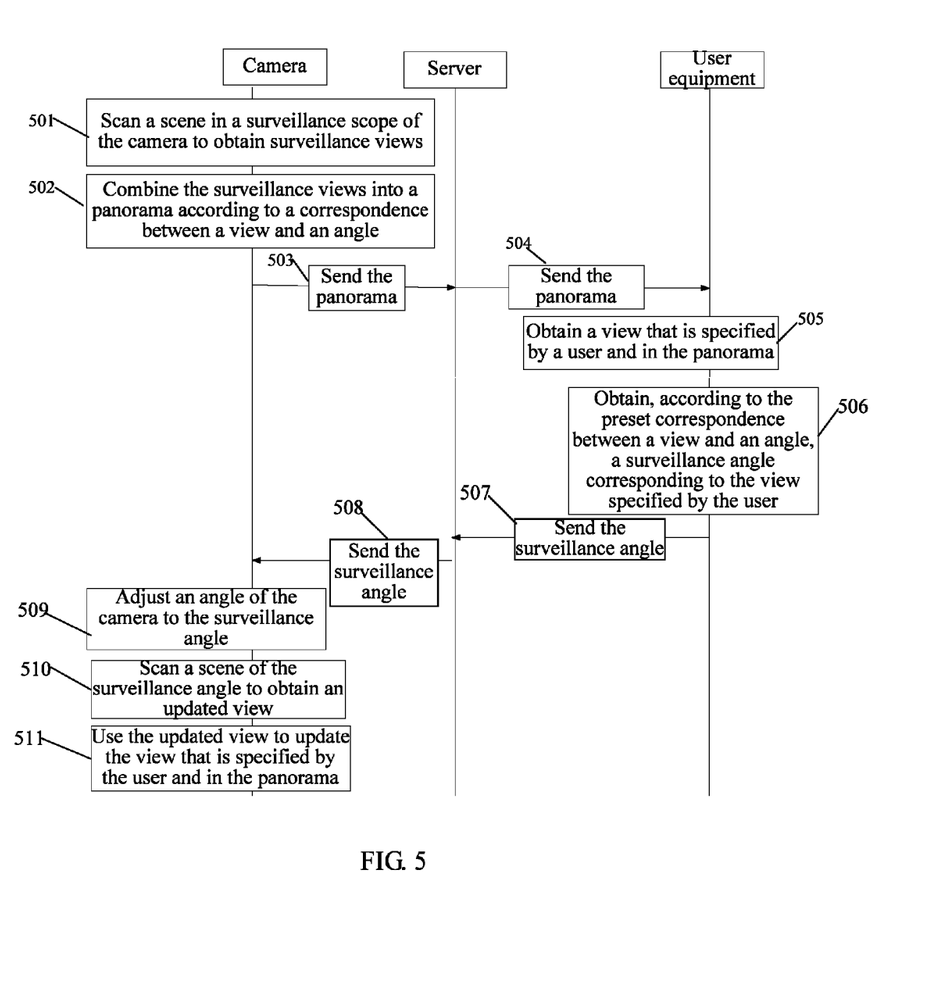
FIG. 5 is a flowchart of another video surveillance method according to Embodiment 1 of the present invention.

This embodiment of the present invention further provides a video surveillance method. As shown in FIG. 5, the method includes the following steps:

501. A camera scans a scene in a surveillance scope of the camera to obtain surveillance views.

502. The camera combines the surveillance views into a panorama according to a correspondence between a view and an angle.

The correspondence between a view and an angle may be a correspondence between a view and an angle, which is generated by directly recording an angle corresponding to a surveillance view when the surveillance view is scanned on a camera side. That is, each time the camera adjusts a surveillance angle, the camera records a center point of a surveillance view corresponding to the surveillance angle, to form the correspondence between a view and an angle.

When the panorama is generated, the camera scans the scene in the surveillance scope of the camera, obtains a surveillance view in each direction in the surveillance scope of the camera by means of scanning, and records a corresponding surveillance angle, and then, according to formulas $$x = \frac{\alpha_h}{H} * \text{Width and } y = \frac{\beta_v}{V} * \text{Height,}$$

calculates a corresponding horizontal coordinate value x of a current surveillance angle in the surveillance view and a corresponding vertical coordinate value y of the current surveillance angle in the surveillance view, where H is a horizontal angle scope that can be monitored by the camera, V is a vertical angle scope that can be monitored by the camera, Width is a width of the surveillance view, Height is a height of the surveillance view, $\alpha_h$ is an angle formed against a horizontal direction when the camera scans the surveillance view, and $\beta_v$ is an angle formed against a vertical direction when the camera scans the surveillance view. Exemplarily, according to the corresponding horizontal coordinate value x of the current surveillance angle in the surveillance view and the corresponding vertical coordinate value y of the current surveillance angle in the surveillance view, the camera may synthesize surveillance views into a planar panorama. In this case, a horizontal scope of the panorama is Width, and a vertical scope of the panorama is Height. Alternatively, according to the corresponding horizontal coordinate value x of the current surveillance angle in the surveillance view and the corresponding vertical coordinate value y of the current surveillance angle in the surveillance view, the camera may synthesize into a spherical panorama the surveillance views, the horizontal angle $\alpha_h$, and the vertical angle $\beta_v$ formed when the camera scans the surveillance view. If the spherical panorama is horizontally expanded, the horizontal scope of the panorama is Width, and the vertical scope of the panorama is Height. In this way, in the panorama, the correspondence between a view and an angle may also be expressed by $$x = \frac{\alpha_h}{H} * \text{Width and } y = \frac{\beta_v}{V} * \text{Height.}$$

A center point of each angle is in a one-to-one mapping relationship with a center point of each view.

It should be noted that the panorama may also be a cylindrical view or a fish-eye view. Correspondingly, a formula for expressing the correspondence between a view and an angle may be adjusted according to specific conditions. For example, a panorama is obtained by means of mathematical linear transformation or nonlinear transformation. Any person skilled in the art may readily figure out variations or replacements without departing from the technical scope disclosed in the present invention, and therefore, details are not described again.

The panorama may also be synthesized by the user equipment. The camera scans a scene in the surveillance scope of the camera to obtain a surveillance view in each direction, and reports each surveillance view and a camera scanning angle value corresponding to each surveillance view to the user equipment; alternatively, when necessary, the user equipment triggers a reporting mechanism of the camera, and then the camera reports the surveillance view and the camera scanning angle value corresponding to each surveillance view to the user equipment, and the user equipment combines the surveillance views into a panorama according to the correspondence between a view and an angle.

The panorama may also be synthesized by a server. A specific synthesis process is the same as a synthesis process on the camera side. Any person skilled in the art may readily figure out variations or replacements without departing from the technical scope disclosed in the present invention, and therefore, details are not described again.

503. The camera sends the panorama to a server.

In this embodiment, the server primarily plays a role in information relaying.

504. The server sends the panorama to the user equipment.

505. The user equipment obtains a view that is specified by a user and in the panorama.

When the user obtains the view that is specified by the user and in the panorama, if the user selects the specified view by clicking, a clicking point is used as a center point of the view specified by the user; if the user selects the specified view by selecting a rectangle, a triangle, or a circle, a geometric center of a shape selected by the user is used as a center point of the view specified by the user. Specially, a selection criterion may be preset in the user equipment, and then, when the user specifies a view, the user equipment determines a corresponding center point according to the selection criterion. Exemplarily, if the preset selection criterion is: the center point of the view specified by the user is a point that is apart from a point specified by the user at a fixed angle or at a fixed distance, then, when the user specifies a point on the panorama, the center point of the view, which is specified by the user and determined by the user equipment, is a point that is apart from the point specified by the user at a fixed angle or at a fixed distance.

506. The user equipment obtains, according to the preset correspondence between a view and an angle, a surveillance angle corresponding to the view specified by the user.

On the one hand, a panorama message sent by the camera carries the correspondence between a view and an angle, where the correspondence is generated by means of recording when the camera scans the surveillance view. The user equipment may directly search out, according to the correspondence between a view and an angle, a surveillance angle of the camera corresponding to the center point of the view specified by the user.

On the other hand, the panorama message sent by the camera does not carry the correspondence between a view and an angle, where the correspondence is generated by means of recording when the camera scans the surveillance view. The user equipment may obtain the correspondence between a view and an angle by means of calculation according to a preset formula. Similarly, as shown in FIG. 4, in the panorama 40, Width is the width of the panorama, Height is the height of the panorama, M(x, y) is the center point of the view 401 specified by the user, where x is the horizontal coordinate of the center point of the view 401 specified by the user and y is the vertical coordinate of the center point, and, according to $$\alpha_h = \frac{x}{\text{Width}} * H \text{ and } \beta_V = \frac{y}{\text{Height}} * V,$$

the user equipment calculates the camera surveillance angles $\alpha_h$ and $\beta_v$ corresponding to the center point.

It should be noted that the surveillance angle $\alpha_h$ is an angle formed against the horizontal direction when the camera scans the surveillance view, and $\beta_v$ is an angle formed against the vertical direction when the camera scans the surveillance view. Therefore, the surveillance angles $\alpha_h$ and $\beta_v$ are relative angles that are set in a frame of reference. In a practical application, the surveillance angles may also be expressed by actual angles of the camera, that is, $\alpha_h$ and $\beta_v$ may be converted into angles of actual rotation of the camera.

507. The user equipment sends the surveillance angle to the server.

508. The server sends the surveillance angle to the camera.

It should be noted that in a practical application, the camera may also obtain the surveillance angle in other manners. For example, the surveillance angle is forwarded by another user equipment in a video surveillance system, or is directly sent by a Client Unit (CU) to the camera, which is not limited in the present invention.

It should be noted that the user equipment in this embodiment of the present invention may be a client terminal device, a server, a decoder, or the like.

509. The camera adjusts an angle of the camera to the surveillance angle.

510. The camera scans a scene of the surveillance angle to obtain an updated view.

The camera adjusts the angle of the camera to the surveillance angle. After the user views surveillance view information corresponding to the angle, the camera scans the scene of the surveillance angle to obtain the updated view.

511. The camera uses the updated view to update the view that is specified by the user and in the panorama.

The camera uses the updated view to replace the view that is specified by the user and in the original panorama, so that the panorama is partly updated and view information in the panorama has timeliness to some extent.

The camera may also send the updated view to the server or the user equipment, and the server or the user equipment updates the view that is specified by the user and in the original panorama.

Specially, in a practical application, the foregoing panorama may also be generated on another device such as a user equipment, a server, or another dedicated device, which is not limited in the present invention.

It should be noted that a sequence of the steps of the video surveillance method provided in this embodiment of the present invention may be adjusted properly, and some steps may also be added or removed according to conditions. Any person skilled in the art may readily figure out modified methods without departing from the technical scope disclosed in the present invention, and therefore, details are not described again.

In a video surveillance method provided in this embodiment of the present invention, a user directly obtains a specified view in a panorama without a need of searching for the specified view by setting a preset location or by manually adjusting a PTZ control button, which reduces complexity of a locating operation. In addition, the specified view is obtained from the panorama and a camera is adjusted to a corresponding surveillance angle, which saves time and improves locating efficiency compared with search in a preset location or manual adjustment. In addition, when the user selects a specified view, the user equipment determines a geometric center point of the specified view. The user equipment obtains a camera surveillance angle according to a preset correspondence between a view and an angle. Because a center point of each angle is in a one-to-one mapping relationship with a center point of each view, accuracy of the obtained camera surveillance angle is high.

Embodiment 2

Figure 6:
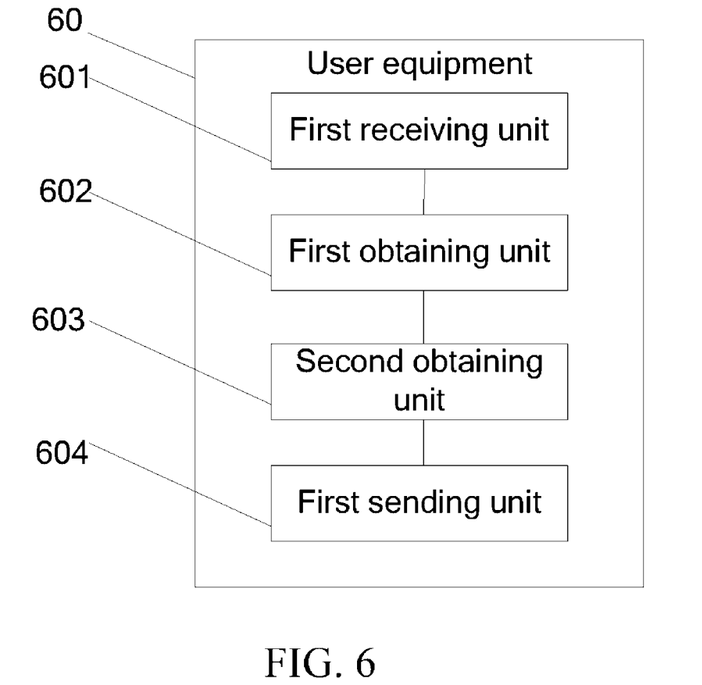
FIG. 6 is a block diagram of a user equipment according to Embodiment 2 of the present invention.

This embodiment of the present invention provides a user equipment 60. As shown in FIG. 6, the user equipment includes a first receiving unit 601 configured to receive a panorama sent by a camera, and send the panorama to a first obtaining unit 602; The first receiving unit 601 is configured to receive the panorama sent by a server, where the panorama is sent by the camera to the server; and send a surveillance angle to the server, so that the server sends the surveillance angle to the camera; the first obtaining unit 602 configured to receive the panorama sent by the first receiving unit 601, obtain a view that is specified by a user and in the panorama, and send the view specified by the user to a second obtaining unit 603; the second obtaining unit 603 configured to receive the view that is specified by the user and sent by the first obtaining unit 602, and obtain, according to a preset correspondence between a view and an angle, the surveillance angle corresponding to the view specified by the user, and send the surveillance angle to a first sending unit 604; The second obtaining unit 603 is configured to obtain a geometric center of the specified view; and obtain, according to the correspondence between a view and an angle, the surveillance angle corresponding to the geometric center; and the first sending unit 604 configured to receive the surveillance angle sent by the second obtaining unit 603, and send the surveillance angle to the camera, so that the camera adjusts an angle of the camera to the surveillance angle.

When video surveillance is implemented using the foregoing device, a user directly obtains a specified view in a panorama without a need of searching for the specified view by setting a preset location or by manually adjusting a PTZ control button, which reduces complexity of a locating operation. In addition, the specified view is obtained from the panorama and a camera is adjusted to a corresponding surveillance angle, which saves time and improves locating efficiency compared with search in a preset location or manual adjustment.

Embodiment 3

Figure 7:
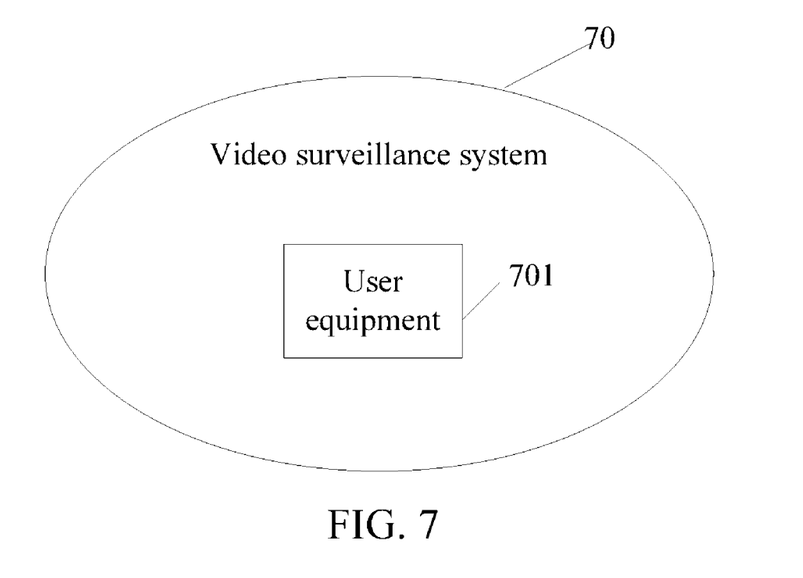
FIG. 7 is a diagram of a video surveillance system according to Embodiment 3 of the present invention.

This embodiment of the present invention provides a video surveillance system 70. As shown in FIG. 7, the system includes a user equipment 701, where the user equipment 701 is configured to receive a panorama sent by a camera 702; obtain a view that is specified by a user and in the panorama; obtain, according to a preset correspondence between a view and an angle, a surveillance angle corresponding to the view specified by the user; and send the surveillance angle to the camera 702, so that the camera 702 adjusts an angle of the camera 702 to the surveillance angle.

Figure 8:
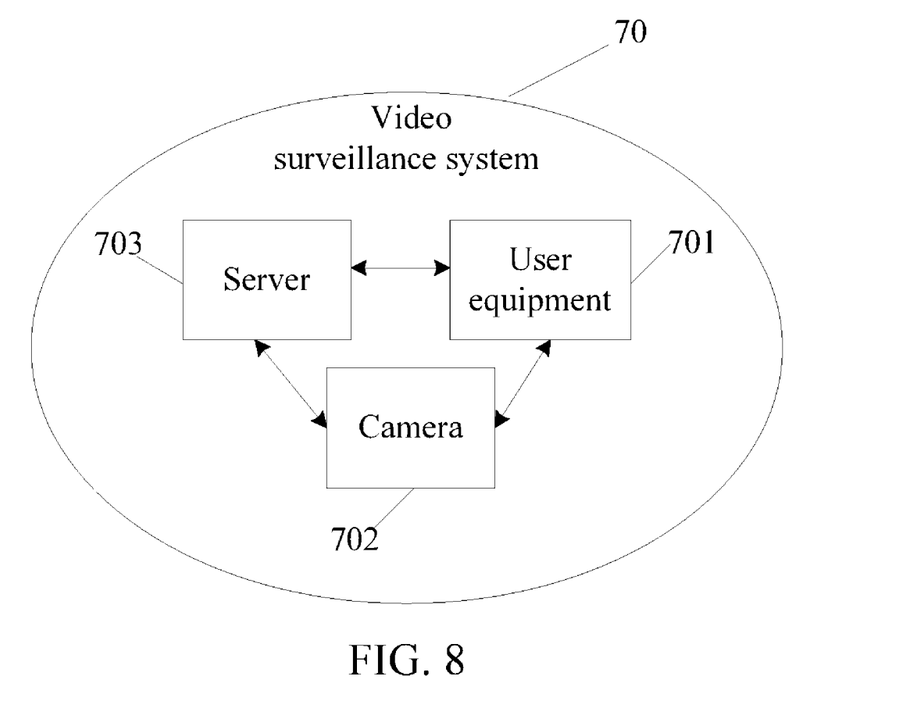
FIG. 8 is a diagram of another video surveillance system according to Embodiment 3 of the present invention.

As shown in FIG. 8, the video surveillance system 70 further includes the camera 702, where the camera 702 is configured to obtain a panorama according to the preset correspondence between a view and an angle, where the panorama is formed by surveillance views in a surveillance scope of the camera 702; send the panorama to the user equipment 701, so that the user equipment 701 obtains the surveillance angle corresponding to the view that is specified by the user and in the panorama; receive the surveillance angle sent by the user equipment 701; and adjust the angle of the camera 702 to the surveillance angle; and a server 703 configured to receive the panorama sent by the camera 702, and send the panorama to the user equipment 701, where the server 703 is further configured to receive the surveillance angle sent by the user equipment 701, and send the surveillance angle to the camera 702.

When video surveillance is implemented using the foregoing system, a user directly obtains a specified view in a panorama without a need of searching for the specified view by setting a preset location or by manually adjusting a PTZ control button, which reduces complexity of a locating operation. In addition, the specified view is obtained from the panorama and a camera is adjusted to a corresponding surveillance angle, which saves time and improves locating efficiency compared with search in a preset location or manual adjustment.

Figure 9:
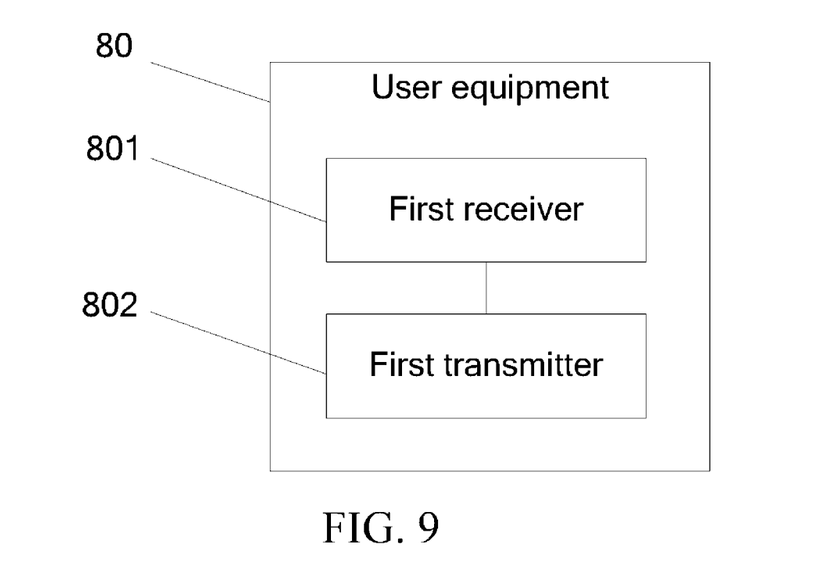
FIG. 9 is a block diagram of another user equipment according to Embodiment 3 of the present invention.

This embodiment of the present invention provides a user equipment 80. As shown in FIG. 9, the user equipment includes a first receiver 801 configured to receive a panorama sent by a camera, where the first receiver 801 is further configured to receive the panorama sent by a server, where the panorama is sent by the camera to the server; and send a surveillance angle to the server, so that the server sends the surveillance angle to the camera.

The first receiver 801 is further configured to obtain a view that is specified by a user and in the panorama.

The first receiver 801 is configured to obtain, according to a preset correspondence between a view and an angle, the surveillance angle corresponding to the view specified by the user; and send the surveillance angle to a first transmitter 802. The first receiver 801 is configured to obtain a geometric center of the specified view; and obtain, according to the correspondence between a view and an angle, the surveillance angle corresponding to the geometric center.

The first transmitter 802 is configured to receive the surveillance angle sent by the first receiver 801, and send the surveillance angle to the camera, so that the camera adjusts an angle of the camera to the surveillance angle.

When video surveillance is implemented using the foregoing device, a user directly obtains a specified view in a panorama without a need of searching for the specified view by setting a preset location or by manually adjusting a PTZ control button, which reduces complexity of a locating operation. In addition, the specified view is obtained from the panorama and a camera is adjusted to a corresponding surveillance angle, which saves time and improves locating efficiency compared with search in a preset location or manual adjustment.

It may be clearly understood by a person skilled in the art that, for ease and brevity of description, for a detailed working process of the foregoing system, device, and unit, reference may be made to a corresponding process in the foregoing method embodiments, and details are not described herein again.

In the several embodiments provided in the present application, it should be understood that the disclosed system, device, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of software functional unit.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A video surveillance method comprising:
   receiving, by a user equipment, a panorama sent by a camera;
   obtaining, by the user equipment, a view that is specified by a user and in the panorama;
   obtaining, by the user equipment, according to a correspondence between a view and an angle, a surveillance angle corresponding to the view specified by the user, wherein the correspondence between the view and the angle comprises formulas:

$$\alpha_h = \frac{x}{\text{Width}} * H \text{ and } \beta_V = \frac{y}{\text{Height}} * V;$$

and
   wherein x is a horizontal coordinate of a center point of the view and y is a vertical coordinate of the center point of the view, H is a horizontal angle scope that can be monitored by the camera and V is a vertical angle scope that can be monitored by the camera, Width is the width of the panorama and Height is the height of the panorama, and $\alpha_h$ is a first angle between the camera and a horizontal direction, and $\beta_v$ is a second angle between the camera and a vertical direction; and
   sending, by the user equipment, the surveillance angle to the camera, to enable the camera to adjust an angle of the camera to the surveillance angle.

2. The video surveillance method according to claim 1, wherein before obtaining, by the user equipment according to the correspondence between the view and the angle, the surveillance angle corresponding to the view specified by the user, the video surveillance method further comprises:
   obtaining, by the user equipment, a geometric center of the specified view as a center point of the specified view.

3. The video surveillance method according to claim 1, wherein receiving, by the user equipment, the panorama sent by the camera, comprises receiving, by the user equipment, the panorama sent by a server, wherein the panorama is sent by the camera to the server, and wherein sending, by the user equipment, the surveillance angle to the camera, comprises sending, by the user equipment, the surveillance angle to the server, so that the server sends the surveillance angle to the camera.

4. A user equipment comprising:
   a processor; and
   a non-transitory computer readable medium which contains computer-executable instructions,
   the processor is configured to execute the computer-executable instructions to perform acts comprising:
   receiving a panorama sent by a camera;
   obtaining a view that is specified by a user and in the panorama;
   obtaining, according to a correspondence between a view and an angle, wherein the correspondence between the view and the angle comprises formulas:

$$\alpha_h = \frac{x}{\text{Width}} * H \text{ and } \beta_V = \frac{y}{\text{Height}} * V; \text{ and}$$

wherein x is a horizontal coordinate of a center point of the view and y is a vertical coordinate of the center point of the view, H is a horizontal angle scope that can be monitored by the camera and V is a vertical angle scope that can be monitored by the camera, Width is the width of the panorama and Height is the height of the panorama, and $\alpha_h$ is a first angle between the camera and a horizontal direction, and $\beta_v$ is a second angle between the camera and a vertical direction; and
   sending the surveillance angle to the camera, to enable the camera to adjust an angle of the camera to the surveillance angle.

5. The user equipment according to claim 4, wherein the processor is further configured to execute the computer-executable instructions to perform acts comprising:
   obtain a geometric center of the specified view as a center point of the specified view.

6. The user equipment according to claim 5, wherein receiving a panorama sent by a camera comprises: receiving the panorama sent by a server, wherein the panorama is sent by the camera to the server;
   sending the surveillance angle to the camera comprises: sending the surveillance angle to the server, so that the server sends the surveillance angle to the camera.

7. A video surveillance system comprising a user equipment and a camera, wherein, the user equipment is configured to:

receive a panorama sent by the camera;
obtain a view that is specified by a user and in the panorama;
obtain, according to a correspondence between a view and an angle, a surveillance angle corresponding to the view specified by the user, wherein the correspondence between the view and the angle comprises formulas:

$$\alpha_h = \frac{x}{\text{Width}} * H \text{ and } \beta_V = \frac{y}{\text{Height}} * V;$$

and
wherein x is a horizontal coordinate of a center point of the view and y is a vertical coordinate of the center point of the view, H is a horizontal angle scope that can be monitored by the camera and V is a vertical angle scope that can be monitored by the camera, Width is the width of the panorama and Height is the height of the panorama, and $\alpha_h$ is a first angle between the camera and a horizontal direction, and $\beta_v$ is a second angle between the camera and a vertical direction; and
send the surveillance angle to the camera, to enable the camera to adjust an angle of the camera to the surveillance angle;
the camera is configured to:
send the panorama to the user equipment;
receive the surveillance angle sent by the user equipment; and
adjust the angle of the camera to the surveillance angle.

8. The video surveillance system according to claim 7 wherein, before sending the panorama to the user equipment, the camera is further configured to:
synthesize the panorama from surveillance views in each direction in a surveillance scope of the camera.

9. The video surveillance system according to claim 7 further comprising:
a server configured to:
receive the panorama sent by the camera;
send the panorama to the user equipment;
receive the surveillance angle sent by the user equipment; and
send the surveillance angle to the camera.

10. The video surveillance method according to claim 1, after sending the surveillance angle to the camera, the video surveillance method further comprises:
receiving, by the user equipment, from the camera, an updated view corresponding to a scene of the surveillance angle;
using, by the user equipment, the updated view to update the view that is specified by the user and in the panorama.

11. The video surveillance method according to claim 1, after sending the surveillance angle to the camera, the video surveillance method further comprises:
scanning, by the camera, a scene of the surveillance angle to obtain an updated view;
using, by the camera, the updated view to update the view that is specified by the user and in the panorama.

12. The user equipment according to claim 4, wherein, after sending the surveillance angle to the camera, the processor is further configured to execute the computer-executable instructions to perform acts comprising:
receiving, from the camera, an updated view corresponding to a scene of the surveillance angle;
using the updated view to update the view that is specified by the user and in the panorama.

13. The video surveillance system according to claim 7, wherein, after sending the surveillance angle to the camera, the user equipment is further configured to:
receive, from the camera, an updated view corresponding to a scene of the surveillance angle;
use the updated view to update the view that is specified by the user and in the panorama.

14. The video surveillance system according to claim 7, wherein, after adjusting the angle of the camera to the surveillance angle, the camera is further configured to:
scan a scene of the surveillance angle to obtain an updated view;
use the updated view to update the view that is specified by the user and in the panorama.

15. The video surveillance system according to claim 7, wherein before obtaining according to the correspondence between the view and the angle, the surveillance angle corresponding to the view specified by the user, the user equipment is further configured to obtain a geometric center of the specified view as a center point of the specified view.

\* \* \* \* \*